(12) United States Patent
Nagatsuma et al.

(10) Patent No.: US 6,240,366 B1
(45) Date of Patent: May 29, 2001

(54) GPS RECEPTION RATIO DETECTING APPARATUS AND PORTABLE TYPE DISTANCE/SPEED METER CAPABLE OF INDICATING GPS SIGNAL RECEIVING CONDITION

(75) Inventors: Hideki Nagatsuma; Kazumi Sakumoto; Hiroshi Odagiri, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/549,361

(22) Filed: Apr. 14, 2000

(30) Foreign Application Priority Data

Apr. 19, 1999 (JP) .................................................. 11-111372

(51) Int. Cl.[7] ............................... G01S 5/02; H04B 7/185
(52) U.S. Cl. ................ 701/213; 342/357.01; 342/357.06
(58) Field of Search ...................... 701/213; 342/357.01, 342/357.05, 357.06, 357.08, 357.12; 455/13.2

(56) References Cited

U.S. PATENT DOCUMENTS

| | | | |
|---|---|---|---|
| 5,897,602 | * 4/1999 | Mizuta | 701/201 |
| 5,999,124 | * 12/1999 | Sheynblat | 342/357.09 |
| 6,031,487 | * 2/2000 | Mickelson | 342/357.12 |
| 6,072,431 | * 6/2000 | Froeberg | 342/357.12 |
| 6,150,980 | * 11/2000 | Krasner | 342/357.1 |

* cited by examiner

Primary Examiner—William A. Cuchlinski, Jr.
Assistant Examiner—Olga Hernandez
(74) Attorney, Agent, or Firm—Adams & Wilks (57) ABSTRACT

In a GPS reception ratio detecting apparatus, a reception condition of GPS electromagnetic waves in a GPS receiver is judged, and a reception ratio indicative of a ratio of "receivable condition" of GPS electromagnetic waves to a total execution time of the reception process operation thereof is indicated. The GPS reception ratio detecting apparatus is arranged by employing: a GPS (Global Positioning System) receiver for executing a reception process operation for receiving GPS electromagnetic waves transmitted from GPS satellites to acquire positioning data from the received GPS electromagnetic waves; reception judging device for judging as to whether or not the positioning data can be acquired in said GPS receiver every time the reception process operation is carried out; and reception ratio calculating device for calculating a reception ratio indicative of a ratio of a total judgment time at which the reception judging device judges that the positioning data can be acquired in the GPS receiver with respect to a total execution time of the reception process operation.

3 Claims, 6 Drawing Sheets

GPS RECEPTION RATIO DETECTING APPARATUS AND PORTABLE TYPE DISTANCE/SPEED METER CAPABLE OF INDICATING GPS SIGNAL RECEIVING CONDITION

BACKGROUND OF THE INVENTION

1. Field of the Invention

The present invention relates to a GPS reception ratio detecting apparatus, and also to a portable type distance/speed meter capable of measuring both a travel distance and a travel speed, equipped with this GPS reception ratio detecting apparatus. The GPS reception ratio detecting apparatus detects a GPS reception ratio indicative of a ratio at which effective GPS electromagnetic waves are received by a GPS receiver.

2. Description of the Related Art

In the GPS (Global Positioning System), 24 sets of the GPS satellites orbit on 6 sets of orbit courses located at an inclined angle of 55 degrees at a distance of approximately 20,200 km on the earth, and travels for approximately 12 hours per one turn. While navigation data required for positioning, transmitted from more than 3 GPS satellites under the most receivable condition are received by a GPS receiver, positioning calculations are carried out by measuring propagation delay time of these navigation data so as to determine travel direction/present position of a user.

In this GPS, two different frequencies "L1 (=1.57542 GHz)" and "L2 (=1.22760 GHz)" are prepared for the transmission frequencies of the GPS satellites. Since the C/A code (namely commercial-purpose code being free-opened) is transmitted at the frequency of 1.57542 GHz (equal to GPS transmission frequency "L1"), one GPS transmission frequency "L1" is utilized in general-purpose positioning operation. It should be understood that the GPS signal having this frequency "L1" is modulated in the PSK (Phase Shift Keying) modulating method by using the pseudonoise code, and then the PSK-modulated GPS signal is transmitted by way of the spread spectrum communication system. This pseudonoise code corresponds to the synthesized wave made from the C/A code used to discriminate the desirable GPS satellite from all of the GPS satellites, and also the navigation data such as the GPS satellite orbit, the GPS satellite orbit information, and the time information.

Figure 6:
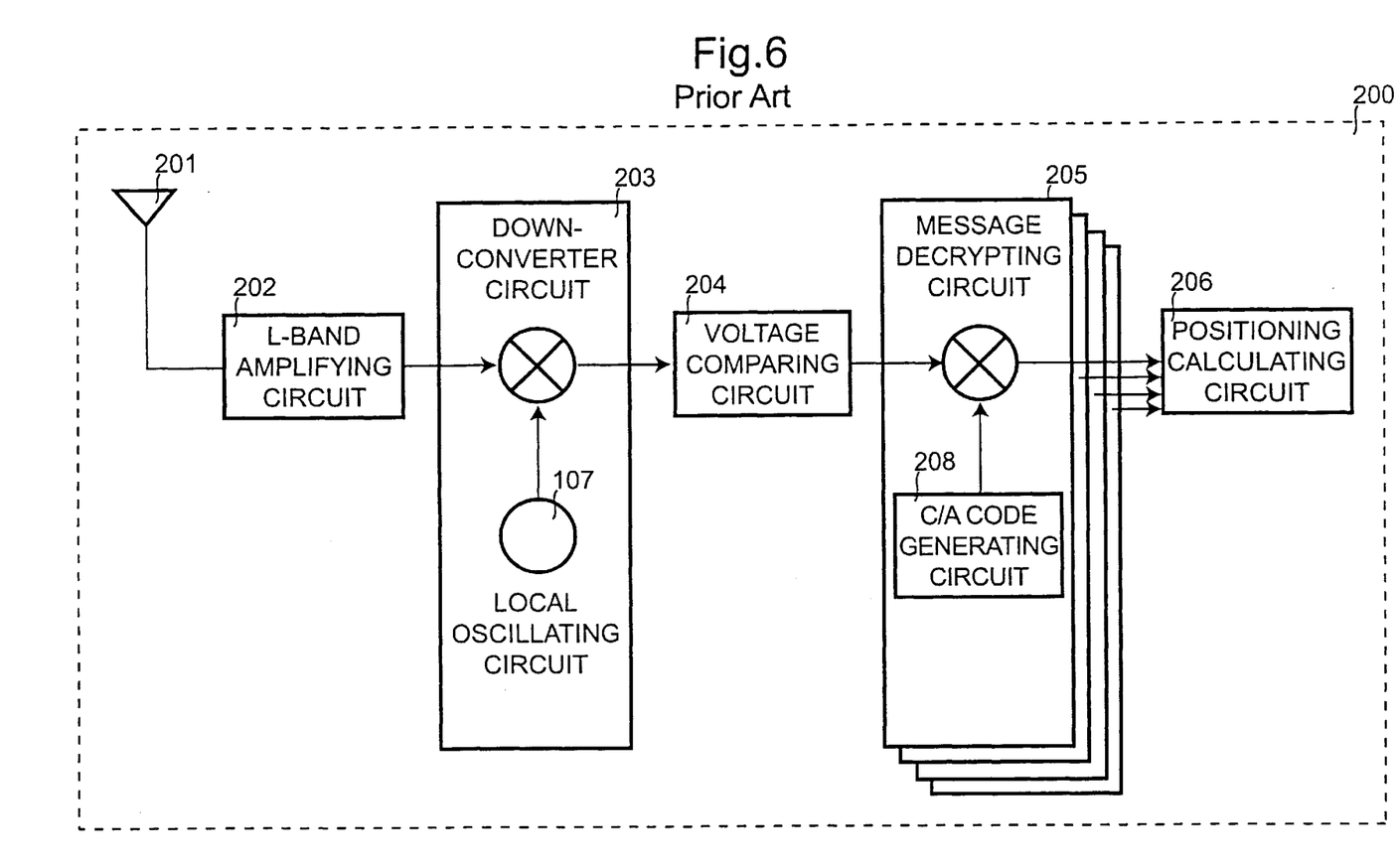
FIG. 6 is a schematic block diagram showing an arrangement of a conventional GPS receiver.

FIG. 6 is a schematic block diagram representing an arrangement of a GPS receiver 200 capable of receiving a GPS electromagnetic wave (namely, GPS signal having frequency of "L1 (=1.57542 GHz)") transmitted from a GPS satellite. As shown in FIG. 6, the GPS receiver 200 is arranged by a reception antenna 201, an L-band amplifying circuit 202, a down-converter circuit 203, a voltage comparing circuit 204, a message decrypting circuit 205, and a positioning calculating circuit 206. The reception antenna 201 receives GPS electromagnetic waves transmitted from the GPS satellites. The L-band amplifying circuit 202 amplifies a GPS signal having an L-band frequency among the received GPS signals. The down-converter circuit 203 performs a down-converting operation of the amplified GPS signal by multiplying this received GPS signal by a signal produced from a local oscillating circuit 107. The voltage comparing circuit 204 digitally converts the GPS signal down-converted by the down-converter circuit 203 into a digital GPS signal. In the message decrypting circuit 205, the digital GPS signal inputted from the voltage comparing circuit 204 is multiplied by a C/A code generated from a C/A code generating circuit 208 so as to acquire both navigation data and carrier wave phase information corresponding to a pseudodistance. The positioning calculating circuit 206 calculates positioning data by using both the navigation data and the carrier wave phase information, which are entered from the message decrypting circuit 205. It should also be noted that the local oscillating circuit 107 corresponds to such a circuit capable of producing a signal used to convert a received GPS signal into another signal having a desirable frequency.

Next, reception operation of this GPS receiver 200 will now be described. In FIG. 6, the L-band amplifying circuit 202 selectively first amplifies the GPS signal having the frequency of 1.57542 GHz received by the reception antenna 201. The GPS signal amplified in the L-band amplifying circuit 202 is entered into the down-converter circuit 203. This down-converter circuit 203 converts this entered GPS signal into a first IF (intermediate frequency) signal having a frequency of from several tens of MHz to 200 MHz by using the local oscillation signal produced from the local oscillating circuit 107, and furthermore, converts this first IF signal into a second IF signal having a frequency on the order of from 2 MHz to 5 MHz. Then, the voltage comparing circuit 204 enters thereinto this second IF signal so as to digitally convert the second IF signal into the digital GPS signal by employing a clock signal having a frequency several times higher than the frequency of this entered second IF signal. In this circuit, this digitally-converted GPS signal will constitute spectrum-spread data (digital signal).

This spectrum-spread data outputted from the voltage comparing circuit 204 is entered into the message decrypting circuit 205. Then, this message decrypting circuit 205 reverse-spreads the C/A code produced from the C/A code generating circuit 208 to the entered digital signal so as to acquire both the navigation data and the carrier wave phase information corresponding to the pseudodistance. The C/A code implies the pseudonoise code identical to that of the GPS satellite.

The above-explained reception operation is carried out with respect to the respective GPS satellites in this GPS receiver 200. Normally, the message decrypting circuit 205 of the GPS receiver 200 may acquire the navigation data and also the carrier wave phase information of 4 sets of the GPS satellites, and then the positioning calculating circuit 206 acquires the positioning data (speed, present position, time information etc.) based upon the acquired navigation data/carrier wave phase information. The positioning data acquired by the positioning calculating circuit 206 is outputted to a CPU (not shown) for controlling the overall reception operation of this GPS receiver 200, or externally outputted as a digital signal. Such a GPS receiver is utilized as a car navigation system by combining positional information of GPS with map information produced from a CD-ROM.

On the other hand, the above-explained GPS receiver 200 is realized in the form of such a portable type GPS receiving apparatus capable of measuring travel speeds/travel distances of persons, since the GPS receiver 200 may be supplied as a digital ASIC (Application Specific IC) due to current technical progresses in semiconductor fields. This portable type GPS receiving apparatus calculates the travel distance and the travel speed of the user based upon the positioning data acquired by employing the GPS receiver 200, and then displays both the travel distance and the travel speed.

However, there are many possibilities that the above-explained GPS receiver 200 cannot receive the GPS electromagnetic waves, because the reception of these GPS electromagnetic waves is disturbed by various disturbing objects, for example, bottom places among buildings and places inside tunnels, and/or when one GPS satellite captured by this GPS receiver 200 is switched to another GPS satellite. As a result, the GPS receiver 200 can hardly acquire the positioning data. Such an unreceivable condition of the GPS electromagnetic waves may be avoided by restricting the utilization environment of this GPS receiver 200. However, this environmental restriction cannot sufficiently achieve the advantages specific to the GPS capable of acquiring global geographical information.

On the other hand, in the above-explained portable type GPS receiving apparatus, both the travel speed and the travel distance when the user walks or runs are calculated by employing the GPS receiver 200. As a consequence, in such a case that the reception of these GPS electromagnetic waves cannot be carried out, the correct GPS calculation results cannot be obtained. More specifically, since a travel trace of a person normally contains a large number of bending portions and curved portions, in such a case that the positional information is extracted from the positioning data acquired from the GPS receiver 200 and then the positional change thereof is calculated as the travel distance, the below-mentioned problem may occur. That is, under such a GPS electromagnetic waves unreceivable condition, a so-called "positional jump" occurs many times, so that a large number of errors are involved in the calculated travel distances. Also, as to the travel speeds, since this travel speed is calculated based upon this erroneous travel distance, a similar problem may occur.

SUMMARY OF THE INVENTION

The present invention has been made to solve the above-explained conventional problems, and therefore, has an object to provide a portable type distance/speed meter capable of measuring both a travel distance and a travel speed of a user, while being equipped with a GPS reception ratio detecting apparatus. An other object of the present invention is to provide a GPS reception ratio detecting apparatus capable of judging a reception condition of GPS electromagnetic waves in a GPS receiver, and of indicating a reception ratio indicative of a receivable ratio.

Figure 1:
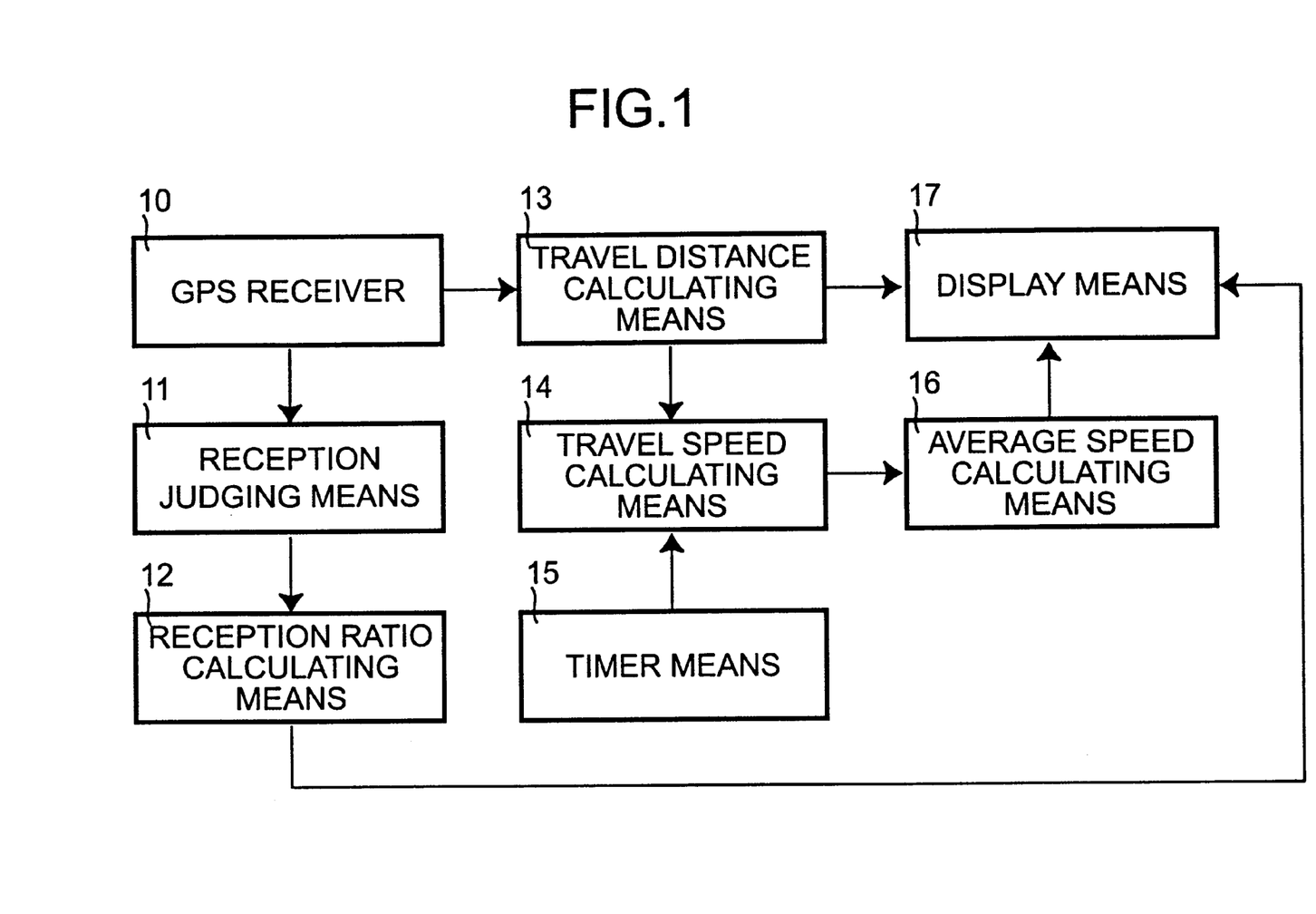
FIG. 1 is a principle diagram indicating an arrangement of a portable type distance/speed meter having a function of a GPS reception ratio detecting apparatus, according to the present invention.

FIG. 1 is a principle diagram representing an arrangement of a portable type distance/speed meter having a function of a GPS reception ratio detecting apparatus, according to the present invention. In FIG. 1, in order to achieve the above-explained objects, a GPS reception ratio detecting apparatus, according to the present invention, is comprised of: a GPS (Global Positioning System) receiver 10 for executing a reception process operation for receiving GPS electromagnetic waves transmitted from GPS satellites to acquire positioning data from the received GPS electromagnetic waves; a reception judging means 11 for judging as to whether or not the positioning data can be acquired in the GPS receiver 10 every time the reception process operation is carried out in the GPS receiver 10; and a reception ratio calculating means 12 for calculating a reception ratio indicative of a ratio of a total judgment time at which the reception judging means judges that the positioning data can be acquired in the GPS receiver 10 with respect to a total execution time of the reception process operation in the GPS receiver 10.

As a result, in accordance with the present invention, the reception judging means judges as to whether or not the positioning data can be acquired, that is, the GPS electromagnetic waves can be received based upon the GPS signals outputted from the GPS receiver 10 by the GPS reception process operation. Then, for example, while the reception judging means counts a total judgment time of "receivable conditions" and a total judgment time of "unreceivable conditions" respectively, the GPS receiving ratio detecting apparatus indicates as the reception ratio such a ratio of the total judgment time of "receivable conditions" to a total execution time of the GPS reception process operations.

Also, a portable type distance/speed meter, according to the present invention, is comprised of: a GPS (Global Positioning System) receiver 10 for executing a reception process operation for receiving GPS electromagnetic waves transmitted from GPS satellites to acquire positioning data from the received GPS electromagnetic waves; a travel distance calculating means 13 for calculating a travel distance of a user based upon the positioning data acquired in the GPS receiver 10; a timer means 15 for measuring travel time of the user over the travel distance; a travel speed calculating means 14 for calculating a travel speed of the user based upon both the travel distance calculated by the travel distance calculating means 13 and the travel time measured by the timer means 15; an average speed calculating means 16 for calculating an average travel speed of the user based upon the travel speed calculated by the travel speed calculating means 14; a reception judging means 11 for judging as to whether or not the positioning data can be acquired in the GPS receiver 10 every time the reception process operation is carried out; a reception ratio calculating means 12 for calculating a reception ratio indicative of a ratio of a total judgment time at which the reception judging means 11 judges that the positioning data can be acquired in the GPS receiver 10 with respect to a total execution time of the reception process operation; and a display means 17 for displaying thereon the reception ratio.

Also, in accordance with the portable type distance/speed meter of the present invention, both the travel distance and the travel speed and also the average travel speed of the user are calculated based upon the GPS electromagnetic waves acquired by the GPS receiver 10. As previously explained, the reception ratio calculating means 12 calculates the reception ration indicative of the ratio of the total judgment time of "receivable condition" to the total execution time of the GPS reception process operation, and then the calculated reception ratio is displayed on the display means 17. For instance, the above-explained travel distance/travel speed/average travel speeds are displayed on this display means 17 in combination with the reception ratio. As a result, the user can visually recognize these measurement values and the reception ratio of the GPS electromagnetic waves at the same time.

Furthermore, according to the portable type distance/speed meter of the present invention, the display means 17 includes a plurality of reception ratio display units used to display a degree of the reception ratio calculated by the reception ratio calculating means 12; and in response to the reception ratio calculated by the reception ratio calculating means 12, the plurality of reception ratio display units are selectively displayed, for instance, in a multi-stage manner of an indicator. As a result, the user can intuitively recognize the degree of the GPS electromagnetic waves reception ratio.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENTS

Referring now to drawings, various preferred embodiment modes of GPS reception ratio detecting apparatuses and portable type distance/speed meters according to the present invention will be described more in detail. It should be understood that the present invention is not limited only to these embodiment modes.

OVERALL ARRANGEMENT OF FIRST GPS RECEPTION RATIO DETECTING APPARATUS

Figure 2:
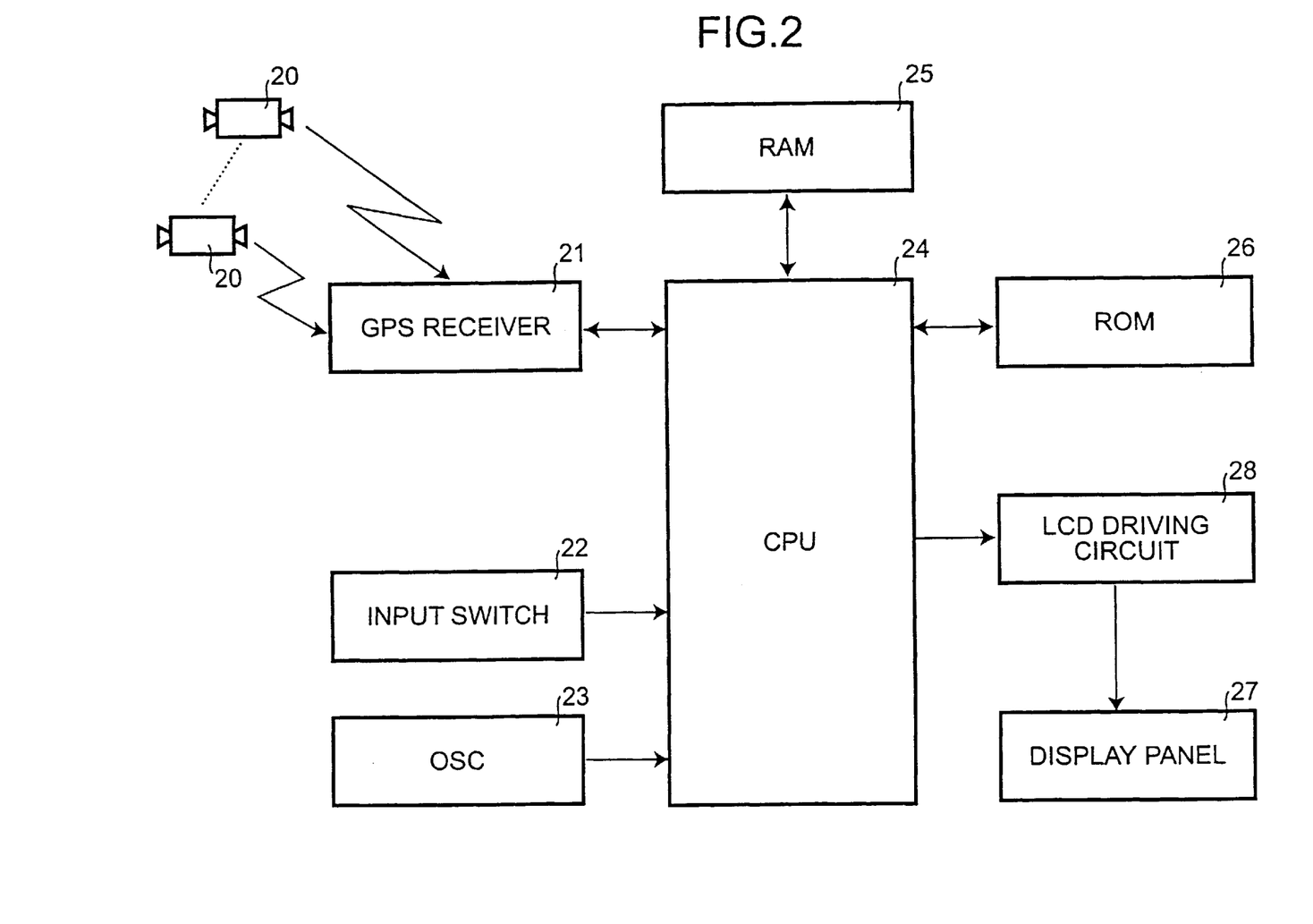
FIG. 2 is a schematic block diagram representing an arrangement of a GPS reception ratio detecting apparatus according to an embodiment mode 1 of the present invention.

FIG. 2 is a schematic block diagram indicating an arrangement of a GPS reception ratio detecting apparatus according to an embodiment mode 1 of the present invention. As indicated in this drawing, this first GPS reception ratio detecting apparatus is arranged by employing a GPS receiver 21, a CPU 24, and an LCD driving circuit 28. The major arrangement of this GPS receiver 21 is indicated in FIG. 6. The GPS receiver 21 receives GPS electromagnetic waves transmitted from a plurality of GPS satellites 20 so as to measure present altitude and also present latitude. The CPU 24 executes various sorts of calculation process operations (will be discussed later) so as to calculate a reception ratio of GPS electromagnetic waves. The LCD driving circuit 28 controls a display panel 27 formed of an LCD (liquid crystal panel) or the like so as to display the reception ratio calculated by the CPU 24 on this display panel 27.

The first GPS reception ratio detecting apparatus is further arranged by using a ROM (read only memory) 26 for previously storing an operation program of the CPU 24, a RAM (random access memory) 25 utilized as a work area of the CPU 24, an input switch 22 used to issue a starting instruction of a GPS signal reception, and an OSC (oscillating circuit) 23 for producing a reference frequency signal.

OPERATION OF FIRST GPS RECEPTION RATIO DETECTING APPARATUS

Figure 3:
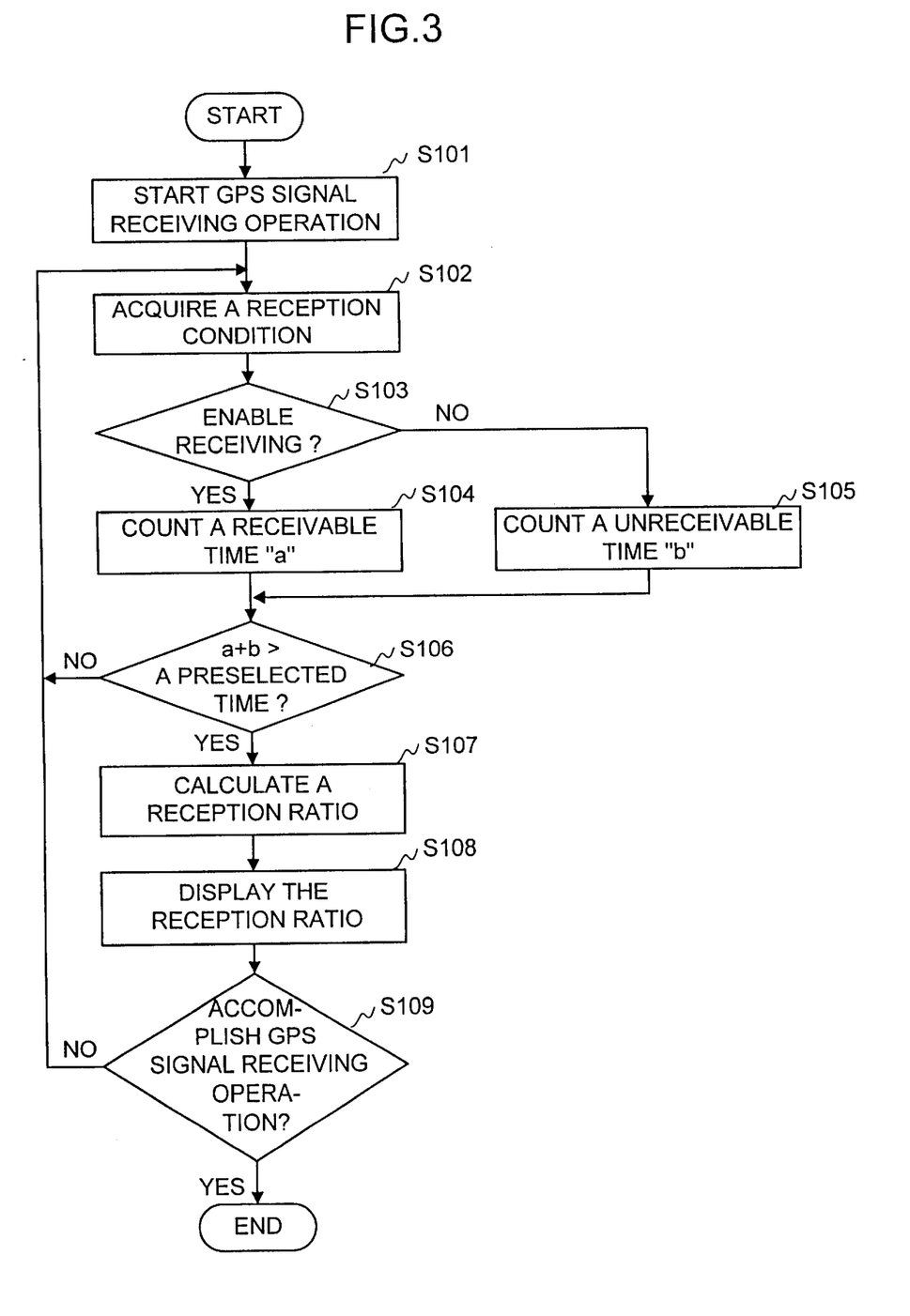
FIG. 3 is a flow chart describing operations of the GPS reception ratio detecting apparatus according to the embodiment mode 1.

Next, a description will now be made of operations of the first GPS reception ratio detecting apparatus with the above-explained arrangement. FIG. 3 is a flow chart describing the operations of this GPS reception ratio detecting apparatus according to the embodiment mode 1. In this flow chart of FIG. 3, when a user firstly manipulates the input switch 22, this first GPS reception ratio detecting apparatus commences a GPS signal receiving operation by the GPS receiver 21 at a step S101. In this case, the GPS reception implies such a process operation that the GPS electromagnetic waves are acquired within such a period, with a sampling interval set to, for example, 1 second, and are countable as reception times.

Next, the CPU 24 acquires a reception condition of GPS electromagnetic waves transmitted from the GPS satellites 20 based upon a strength of a GPS signal outputted from the GPS receiver 21 in accordance with this GPS electromagnetic wave acquisition process operation (step S102), and judges as to whether or not positioning data can be extracted from this GPS signal (step S103). In this first embodiment mode, when positioning data can be extracted, this condition is explained as a "receivable condition of GPS electromagnetic wave", whereas when positioning data cannot be extracted, this condition is explained as an "unreceivable condition of GPS electromagnetic wave."

As a result, for instance, when the strength of the signal outputted from the GPS receiver 21 is equal to or larger than a predetermined threshold value, the CPU 24 judges this GPS signal reception condition as "receivable condition", whereas when the signal strength of this GPS receiver 21 is smaller than this threshold value, the CPU 24 judges this GPS signal reception condition as "unreceivable condition" at the step S103. In this case, the above-explained "unreceivable condition" implies such a condition that the GPS reception ratio detecting apparatus cannot receive GPS electromagnetic waves, because the reception of these GPS electromagnetic waves is disturbed by various disturbing objects, for example, bottom places among buildings and places inside tunnels, and/or when one GPS satellite captured by this GPS reception ratio detecting apparatus is switched to another GPS satellite. As a result, the GPS reception detecting apparatus can hardly acquire the positioning data.

When the CPU 24 judges that the present reception condition corresponds to the "receivable condition" of the GPS electromagnetic waves at the step S103, the CPU 24 counts a receivable time "a" at a step S104. This receivable time "a" indicates a total time of judgments as to the "receivable condition." To the contrary, when the CPU 24 judges that the present reception condition corresponds to the "unreceivable condition" of the GPS electromagnetic waves at the step S103, the CPU 24 counts an unreceivable time "b" at a step S105. This unreceivable time "b" indicates a total time of judgments as to the "unreceivable condition."

After the process operation defined at either the step S104 or the step S105 is accomplished, the CPU 24 judges as to whether or not a summation between the receivable time "a" and the unreceivable time "b" is larger than a preselected time at a step S106. It should be noted that a summation between the receivable time "a" and the unreceivable time "b" corresponds to a value indicative of a sampling time performed in the above-explained GPS electromagnetic wave acquisition process operation. In other words, when the CPU 24 judges that the summation between the receivable time "a" and the unreceivable time "b" is larger than a preselected time at the step S106, the CPU 24 calculates the reception ratio at a step S107. Also, when the CPU 24 judges that the summation between the receivable time "a" and the unreceivable time "b" is equal to or smaller than a preselected time at the step S106, the process operation is returned to the previous step S102 at which the CPU 24 repeatedly counts either the receivable time "a" or the unreceivable time "b".

The reception ratio calculating process operation defined at the step S107 is carried out by dividing the receivable time "a" by the summation between the receivable time "a" and the unreceivable time "b". Then, this division result is converted into, for instance, a percentage so as to be displayed on the display panel 27 (step S108). After this display process operation at the step S108, the CPU 24 judges as to whether or not the user manipulates the input switch 22 to instruct a completion of this GPS reception operation (step S109). At the step S109, when the completion of this GPS reception operation is instructed, a series of the above-described process operation indicated in FIG. 3 is accomplished. To the contrary, when such a completion of the GPS reception operation is not instructed, the process operation defined from the step S102 is repeatedly carried out.

Figure 4:
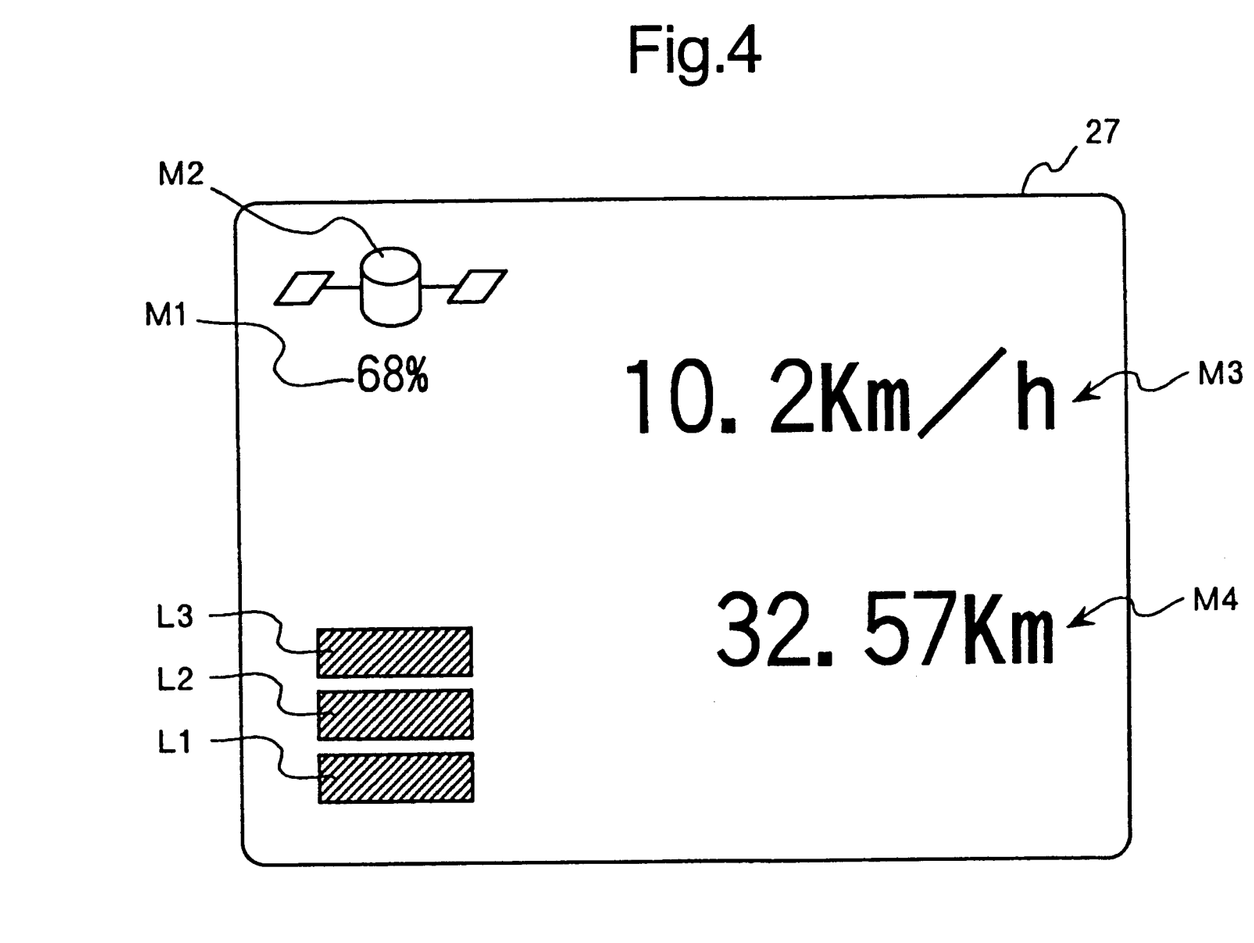
FIG. 4 is a diagram representing a display example of the reception ratio on a display panel.

FIG. 4 is a diagram representing a display example of a reception ratio displayed on the display panel 27. In FIG. 4, the reception ratio calculated at the step S107 is displayed on a region "M1" of this display panel 27. In the above-described step S108, the reception ratio is displayed on this region M1. Alternatively, in accordance with the GPS reception ratio receiving apparatus of this embodiment mode 1, only a minimum reception ratio within a predetermined time period may be displayed. Also, when the calculation result equal to or larger than a predetermined reception ratio is obtained at the step S107, a symbol, or a character which indicates a better reception condition may be displayed on another region "M2" as shown in FIG. 4. Furthermore, while a reception ratio to be calculated is subdivided into multi-staged regions, this reception ratio may be indicated on these multi-staged regions in a similar manner to a level indicator. For instance, as illustrated in FIG. 4, in such a case that a reception ratio represents 0 to 40%, a level bar "L1" may be indicated. In such a case that a reception ratio represents 41 to 70%, a level bar "L2" may be indicated. In such a case that a reception ratio represents 71 to 100%, a level bar "L3" may be indicated.

As a consequence, in accordance with the GPS receiving ratio detecting apparatus of this embodiment mode 1, the CPU judges as to whether or not the GPS electromagnetic waves can be received based upon the GPS signals outputted from the GPS receiver 10 by the GPS reception process operation. Then, while the CPU counts a total judgment time of "receivable conditions" and a total judgment time of "unreceivable conditions" respectively, the CPU indicates as the reception ratio such a ratio of the total judgment time of "receivable conditions" to a total execution time of the GPS reception process operations. As a result, the user can judge as to whether or not the reliable GPS calculation by using the GPS electromagnetic waves can be realized by observing this indication of the reception ratio.

ARRANGEMENT OF SECOND PORTABLE TYPE DISTANCE/SPEED METER

The above-explained GPS reception ratio detecting apparatus, according to the first embodiment mode 1, indicates as the reception ratio, the ratio of such a total time that the GPS electromagnetic waves can be received to extract the positioning data with respect to the total execution time of the GPS reception process operation. Normally, an apparatus equipped with a GPS receiver 21 has a function of such a distance/speed meter for acquiring positioning data so as to calculate/display both a travel distance and a travel speed. When the above-explained GPS reception ratio detecting apparatus is mounted on this apparatus, it is possible to indicate reliabilities of the travel distance and the travel speed displayed by way of the function of this distance/speed meter. As a consequence, in this embodiment mode 2, a description will now be made of a portable type distance/speed meter equipped with the GPS reception ratio detecting apparatus according to the embodiment mode 1.

It should be noted that the portable type distance/speed meter according to this embodiment mode 2 has similar structural elements to those shown in FIG. 2, namely, a GPS receiver 21, an input switch 22, an OSC 23, a CPU 24, a RAM 25, a ROM 26, a display panel 27, and an LCD driving circuit 28. Accordingly, detailed descriptions of these structural elements are omitted in this embodiment mode 2. In this CPU 24, the below-mentioned calculation process operation related to a travel speed and a travel distance is additionally carried out.

Figure 5:
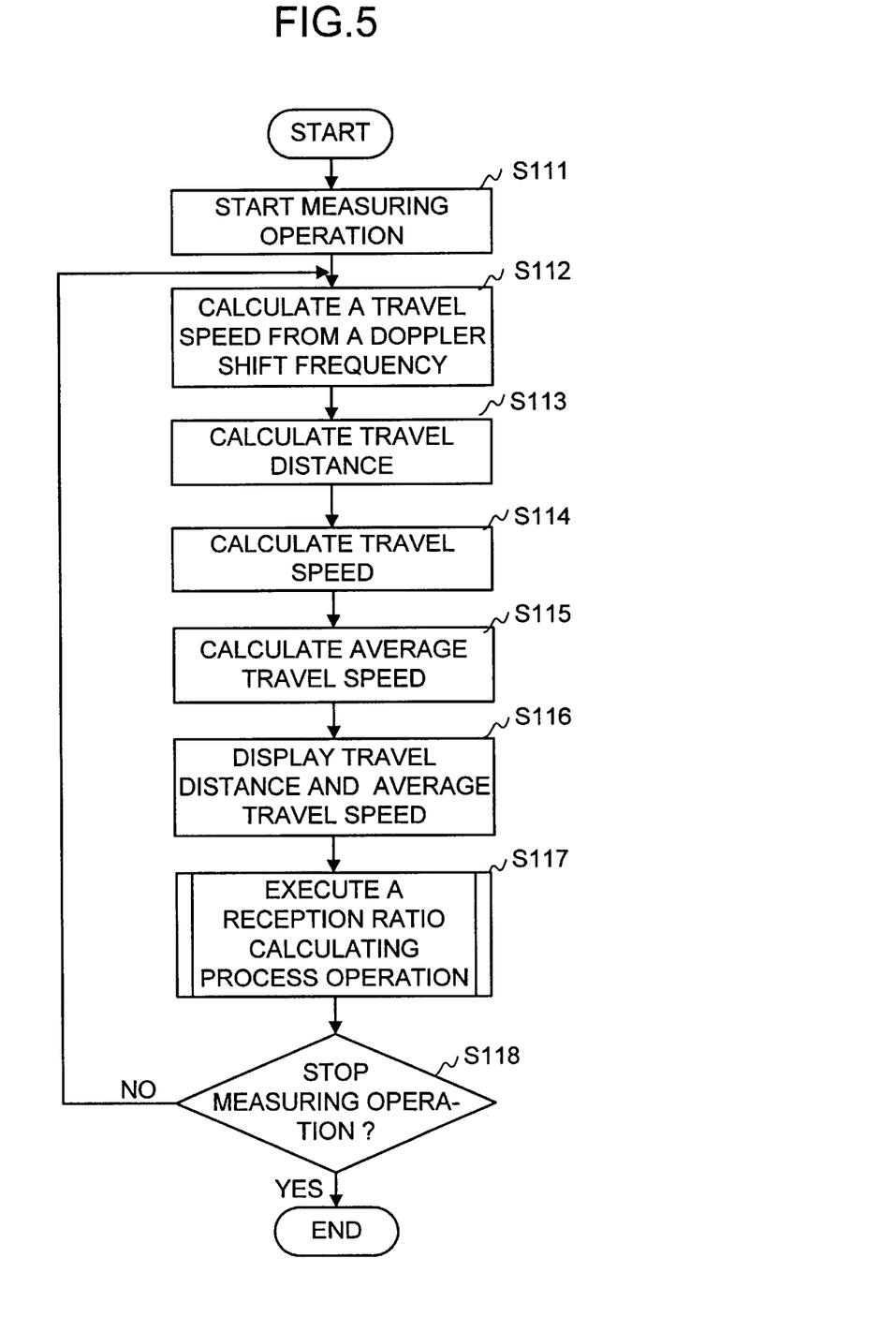
FIG. 5 is a flow chart indicating operations of a portable type distance/speed meter according to an embodiment mode 2 of the present invention.

Next, a description will now be made of operations of this portable type distance/speed meter. FIG. 5 is a flow chart describing the operations of this portable type distance/speed meter according to the embodiment mode 2. In this flow chart of FIG. 5, when a user firstly manipulates the input switch 22, this portable type distance/speed meter commences the measuring operations of a present travel speed and also of an average travel speed of the user at a step S111.

Next, the CPU 24 calculates a travel speed from a Doppler shift frequency of GPS electromagnetic waves acquired by the GPS receiver 10 at a step S112, and then calculates a travel distance of the user by accumulating this calculated travel speed at a step S113. Concretely speaking, this travel distance may be calculated as follows. That is, while a timer counter corresponding to the timer means 15 shown in FIG. 1 is employed so as to measure predetermined time, the travel speed obtained from the Doppler shift frequency is multiplied by this measured predetermined time to obtain such a travel distance. Alternatively, this travel distance may be calculated in accordance with the below-mentioned manner other than the utilization of the Doppler shift frequency information. That is, while positional information at one time instant corresponding to a starting time instant of the above-explained predetermined time and also positional information at another time instant corresponding to an ending time instant thereof are acquired, a travel distance may be calculated based on a difference between two pieces of the acquired positional information.

As a result, when the travel distance is calculated, as previously explained, since the timer counting operation is carried out for a predetermined time, the travel speed of the user can be calculated by dividing the calculated travel distance by the counted predetermined time (step S114). It should be noted that the process operation of this step S114 is not especially needed, since the travel speed has been acquired at the previous step S112 when the Doppler shift frequency is utilized. To the contrary, this process operation of the step S112 is required in the case that the travel distance is calculated from the difference between two pieces of the above-explained positional information. Next, the CPU 24 calculates an average travel speed of the travel speeds calculated at the step S114 (step S115). At this step S115, concretely speaking, this average travel speed calculation is performed as follows. That is, the present travel speed calculated at the step S114 during the present measuring operation is accumulated with respect to the previous travel speeds which have been previously calculated within a predetermined time at the step S114. Thereafter, this accumulated speed result is divided by a total number of these accumulating operations.

Both the accumulated travel distance and the average travel speed calculated at the step S113 and S115 are displayed on the display panel 27 under control of the CPU 24 via the LCD driving circuit 28 (step S116). For example, as shown in FIG. 4, the travel distance calculated at the step S113 is displayed on the region M3 on the display panel 27, whereas the average travel speed calculated at the step S115 is displayed on the region M4 on this display panel 27.

After the process operation defined at a step S116, the CPU 24 executes a reception ratio calculating process operation (step S117). This reception ratio calculating process operation corresponds to the process operation (see FIG. 3) as explained in the embodiment mode 1. At this step S117, the above-described process operations defined from the step S102 to step S109 shown in FIG. 3 are carried out. As a consequence, the explanations of these process operations are omitted. It should also be noted that since the GPS reception indicated at the step S111 of FIG. 5 is apparently commenced, this process operation corresponds to the commencement of the GPS reception indicated at the step S101 of FIG. 3. In other words, when the process operation defined at this step S117 is executed, both the above-described travel distance and average travel speed are displayed, and further the reception ratio is displayed on the display panel 27.

After this display process operation at the step S117, the CPU 24 judges as to whether or not the user manipulates the input switch 22 to instruct a completion of the measuring operation of the travel distance/speed (step S118). It should also be understood that this process operation defined at the step S118 corresponds to the above-explained process operation defined at the step S109 shown in FIG. 3. At the step S118, when the completion of this measuring operation is instructed, a series of the above-described process operation indicated in FIG. 5 is accomplished. To the contrary, when such a completion of the measuring operation is not instructed, the process operation defined from the step S112 is repeatedly carried out so as to calculate the travel distance and the travel speed.

Therefore, in accordance with the above-explained portable type distance/speed meter of this embodiment mode 2, both the travel distance and the average travel speed of the user are calculated based upon the GPS electromagnetic waves acquired from the GPS receiver 10. Also, in accordance with the portable type distance/speed meter of this embodiment mode 2, the CPU judges as to whether or not the GPS electromagnetic waves can be received based upon the GPS signals outputted from the GPS receiver 10 by the GPS reception process operation. Then, while the CPU counts a total judgment time of "receivable conditions" and a total judgment time of "unreceivable conditions" respectively, the CPU indicates as the reception ratio such a ratio of the total judgment time of "receivable conditions" to a total execution time of the GPS reception process operations. As a result, the user can judge to what degree, both the travel distance and the average travel speed displayed on the display panel 27 are adversely influenced by "unreceivable condition" by observing this indication. In other words, the user can judge to what degree, these travel distance/average travel speed can be reliably accepted.

Alternatively, in this portable type distance/speed meter, while either a predetermined section or a predetermined time period is defined base upon either the calculated travel distance or the calculated travel time, a standard deviation value related to a plurality of reception ratios may be calculated, and then this standard deviation value may be displayed on the display panel 27. The plural reception ratios are calculated within either this predetermined section or this predetermined time period. As a result, this displayed standard deviation value may cause the user to recognize to what degree, the measurement error is contained in both the travel distance and the average travel speed presently displayed.

Also, in the above-explained embodiment mode 2, the speed is calculated from the Doppler shift frequency of the GPS electromagnetic waves acquired by the GPS receiver 10 at the step S112 of FIG. 5, and then the travel distance calculated by accumulating this speed is displayed on the display panel 27 at the step 113 of FIG. 5. Alternatively, while a travel distance is newly calculated by employing the average travel speed calculated at the step S115 of FIG. 5, this travel distance may be displayed on the display panel 27.

It should be understood that the above-explained portable type distance/speed meters according to the embodiment mode 2 may be preferably used as a wrist watch mounted on a human body. More specifically, when a marathon runner practices running, the portable type distance/speed meter may be suitably employed as a distance/speed meter.

As previously explained, in accordance with the GPS reception ratio detecting apparatus according to the present invention, the CPU judges as to whether or not the positioning data can be acquired based upon the signals outputted from the GPS receiver by the GPS reception process operation. In other words, the CPU judges as to whether or not the GPS electromagnetic waves can correctly be received based upon the GPS signals outputted from the GPS receiver 10 by the GPS reception process operation. Then, while the CPU counts a total judgment time of "receivable conditions" and a total judgment time of "unreceivable conditions" respectively, the CPU indicates as the reception ratio, for example, such a ratio of the total judgment time of "receivable conditions" to a total execution time of the GPS reception process operations. As a result, the user can judge as to whether or not the reliable GPS calculation by using the GPS electromagnetic waves can be realized by observing this indication of the reception ratio.

Also, in accordance with the portable type distance/speed meter of the present invention, both the travel distance and the travel speed and also the average travel speed of the user are calculated based upon the GPS electromagnetic waves acquired by the GPS receiver. Furthermore, the reception ratio calculating means calculates the reception ration indicative of the ratio of the total judgment time of "receivable condition" to the total execution time of the GPS reception process operation, and then the calculated reception ratio is displayed on the display means. For instance, the above-explained travel distance/travel speed/average travel speeds are displayed on this display means in combination with the reception ratio. As a result, the user can visually recognize these measurement values and the reception ratio of the GPS electromagnetic waves at the same time, and furthermore, the user can judge to what degree, both the travel distance and the average travel speed presently displayed on the display panel 27 are adversely influenced by "unreceivable condition" by observing this indication. In other words, the user can judge to what degree, these travel distance/average travel speed can be reliably accepted.

What is claimed is:
1. A GPS reception ratio detecting apparatus comprising:
   a GPS (Global Positioning System) receiver for executing a reception process operation for receiving GPS electromagnetic waves transmitted from GPS satellites to acquire positioning data from the received GPS electromagnetic waves;

reception judging means for judging as to whether or not said positioning data can be acquired in said GPS receiver every time said reception process operation is carried out; and reception ratio calculating means for calculating a reception ratio indicative of a ratio of a total judgment time at which said reception judging means judges that said positioning data can be acquired in said GPS receiver with respect to a total execution time of said reception process operation.

2. A portable type distance/speed meter comprising:

a GPS (Global Positioning System) receiver for executing a reception process operation for receiving GPS electromagnetic waves transmitted from GPS satellites to acquire positioning data from the received GPS electromagnetic waves;

travel distance calculating means for calculating a travel distance of a user based upon said positioning data;

timer means for measuring travel time of the user over said travel distance;

travel speed calculating means for calculating a travel speed of the user based upon both said travel distance calculated by said travel distance calculating means and said travel time measured by said timer means;

average speed calculating means for calculating an average travel speed of the user based upon said travel speed calculated by said travel speed calculating means;

reception judging means for judging as to whether or not said positioning data can be acquired in said GPS receiver every time said reception process operation is carried out;

reception ratio calculating means for calculating a reception ratio indicative of a ratio of a total judgment time at which said reception judging means judges that said positioning data can be acquired in said GPS receiver with respect to a total execution time of said reception process operation; and display means for displaying thereon said reception ratio.

3. A portable type distance/speed meter as claimed in claim 2 wherein:

said display means includes:

a plurality of reception ratio display units used to display a degree of said reception ratio; and in response to the reception ratio calculated by said reception ratio calculating means, said plurality of reception ratio display units are selectively displayed.

* * * * *